INVENTOR.
HOWARD R. BUSH
BY
Townsend and Townsend
ATTORNEYS

INVENTOR.
HOWARD R. BUSH
BY
Townsend and Townsend
ATTORNEYS

United States Patent Office 3,541,504
Patented Nov. 17, 1970

3,541,504
VEHICLE LAMP FAILURE INDICATOR
Howard R. Bush, 795 Cuesta Drive,
Mountain View, Calif. 94040
Continuation-in-part of application Ser. No. 611,451,
Jan. 24, 1967. This application June 1, 1967, Ser.
No. 642,823
Int. Cl. B60q *1/04;* G08b *5/36*
U.S. Cl. 340—52                        1 Claim

ABSTRACT OF THE DISCLOSURE

A circuit including a photocell in light communication with a lamp on a vehicle, which circuit also includes a signal lamp visible to the operator of the vehicle for indicating to the operator a malfunctioning in the vehicle light system.

---

This is a continuation-in-part of my copending application for patent, Ser. No. 611,451, filed Jan. 24, 1967, now abandoned.

This invention relates to a system for providing an indication of malfunctioning of lamps existing in parts of a system that are obscure to the operator of the system. More specifically, this invention relates to an automobile lamp burn-out detector that employs a photoelectric cell mounted in light communication with the lamps in the system but not electrically connected to automobile lighting circuits.

Known prior art with respect to the present invention is exemplified in U.S. Pat. No. 2,731,628 which describes a system for affording an automobile taillight burn-out indicator, which system employs a relay coil in series with the conductor that extends from a vehicle battery to the lamp. Although such prior art devices are satisfactory, they have certain disadvantages among which are the necessity for insertion of a high resistance relay coil in series with the vehicle lamps which tends to reduce the light output of the lamps and which relay is subject to failure, should the coil thereof burn out, with consequent interruption of current supply to the vehicle light.

By way of contrast, the present invention employs a photoelectric cell mounted in light communication with the vehicle lamp which photoelectric cell responds to light energy impinging thereon from the vehicle lamp when the vehicle lamp is operating properly. Included in circuit with the photoelectric cell is a dashboard-mounted indicator light which apprises the automobile operator of the condition of the vehicle lamp with which the photoelectric cell is associated.

An object of the present invention is to provide a vehicle lamp burn-out indicator which performs its intended function without interposition into the power circuit to the lamp. This object is accomplished by providing within the reflector housing normally included with the vehicle lamps and in light communication with the lamp therein a photosensitive cell which has a resistance proportional to the magnitude of light energy impinging thereon. In combination with the foregoing is an electric circuit that includes a dash-mounted indicator lamp for informing the operator of the vehicle at all times as to the condition of the lamp. Accomplishment of this object expedites installation of the present invention to existing automobile lighting circuits.

Another object is to provide a burn-out indicating system which can be conveniently arranged to indicate the malfunctioning of any one of a number of lamps on a motor vehicle. Achievement of this object is particularly important in automotive taillight assemblies that include both a taillight and a spotlight or brake light located in the same housing.

The foregoing objects together with other objects, features and advantages of the invention will be more apparent after referring to the following specification and accompanying drawing in which.

Figure 1:
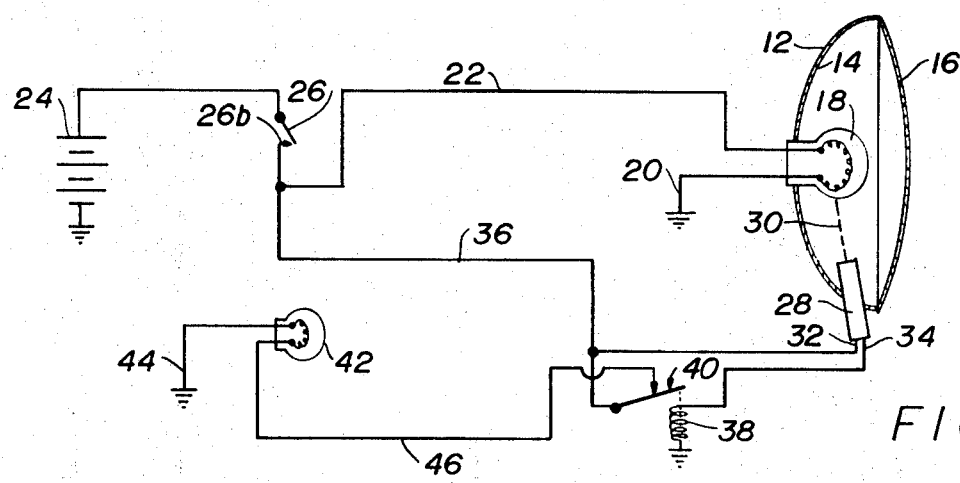
FIG. 1 is a schematic diagram of one form of my invention.

Referring more particularly to the drawing, reference numeral 12 indicates a taillight housing which is typically mounted at the rear end of an automobile for warning other drivers of the presence of the automobile. Such housing typically includes a parabolic reflective surface 14 and a translucent lens 16. Mounted within the housing at or near the focal point of parabolic surface 14 is a lamp 18. Lamp 18 has two filament terminal connections, one of which is grounded at 20 and the other of which is connected by a conductor 22 to the vehicle battery 24 through a dashboard-mounted light switch 26. Switch 26 includes a contact 26b which is only connected to battery 24 when the switch is moved to the closed or "on" position. The elements described to this point are provided in all modern motor vehicles and do not in themselves constitute a portion of the present invention.

According to the present invention, a light sensitive element or photocell 28 is mounted in housing 12 and is oriented so as to be in light communication with lamp 18, the path of such light communication being indicated at 30. As can be seen in the drawing, the orientation of photocell 28 is such that it is not in light communication with light entering the housing through lens 16. Photocell 28 is a conventional element which has a pair of output leads 32 and 34, and which is constructed so that the electrical resistance between such output leads is proportional to the light impinging on the photocell. In order to exemplify but not limit the present invention, the photocell shown in the drawing has a resistance inversely proportional to the magnitude of light energy impinging thereon. In one system, according to the present invention, a photocell known in commerce as Clairex No. 704L was found satisfactory; such cell has a resistance of about 600 ohms when fully illuminated and a resistance of about 400,000 ohms when dark.

Output lead 32 is connected through a conductor 36 to contact 26b of switch 26, and output lead 34 is connected through a relay coil 38 to ground. Associated with relay coil 38 is a normally closed contact 40 which opens a circuit only when coil 38 is energized. Provided in view of the operator of the automobile, for example on the dashboard, is an indicator light 42 which has one terminal grounded at 44 and the other terminal connected by a conductor 46 through relay contacts 40 to switch contact 26b.

The operation of the embodiment of the invention as depicted in FIG. 1 can be appreciated by first assuming that switch 26 is in the open position as shown in the drawing, a position occurring when the automobile is parked or when the automobile is driven during daytime. In such position it can be seen that no load whatsoever is imposed on battery 24 since all circuit connections are made to contact 26b. When the operator of the automobile elects to turn on the taillight by closure of switch 26, power is supplied to lamp 18 as well as to the burn-out detecting system of the present invention. If lamp 18 is functioning properly, i.e., is illuminated, the electrical resistance of photocell 28 is sufficiently low that current flow from battery 24 through relay coil 38 is adequate to energize the relay to open contacts 40. If, on the other hand, lamp 18 is defective, photocell 28 is not illuminated and therefore assumes its high resistance state. In such high resistance state the current flow from battery 24 through relay coil 38 is inadequate to effect energization of the coil so that a circuit through contact 40 to lamp 42 is completed thereby illuminating the lamp. The operator of the vehicle is thereby apprised of the defective condition of tail lamp 18. Because of the orientation of photocell 28, light energy from external sources, such as from the headlights of vehicles following the vehicle in which my system is installed, cannot illuminate photocell 28 and, therefore, cannot create false indications of taillight operation.

Figure 2:
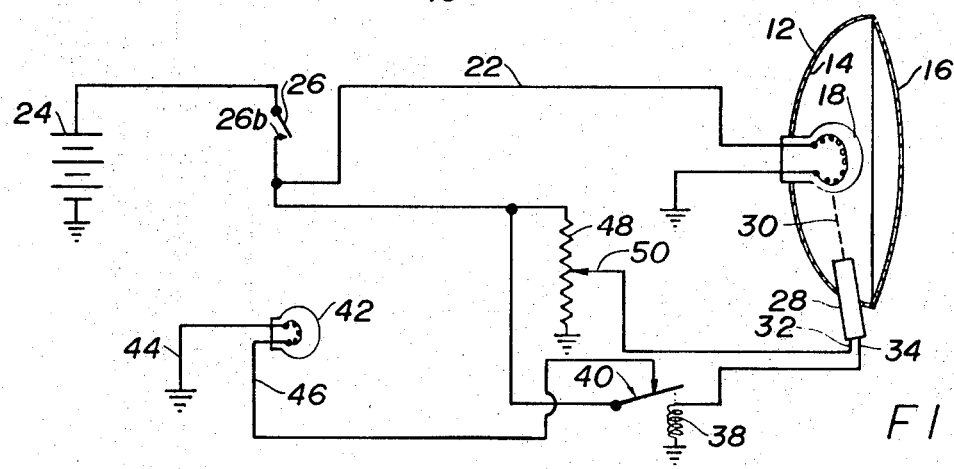
FIG. 2 is a schematic diagram of a modified form of my invention.

Because the modification of my invention depicted in FIG. 2 is in many aspects similar to the circuit of FIG. 1, identical reference characters are used to identify identical parts of the system. In the system of FIG. 2, however, a potentiometer or variable resistor 48 is connected from contact 26b to ground, and output terminal 32 of photocell 28 is connected to a moving contact 50 of the potentiometer. In all other aspects the circuit of FIG. 2 is identical. The presence in the circuit of potentiometer 48 permits adjustment of the sensitivity of the circuit to accommodate such variations in electrical characteristics of photocell 28 and relay coil 38 as may exist, and also accommodates for variations in the spatial relationship between photocell 28 and tail lamp 18. Accordingly, the system shown in FIG. 2 can be installed on various types of vehicles having various forms and/or sizes of taillight housings 12 while preserving accurate response to occurrence of a taillight burnout. After a system is installed in a particular automobile, moving contact 50 of potentiometer 48 is adjusted to secure the desired response and to avoid false signals from external light entering housing 12 through lens 16.

The operation of the embodiment of my invention shown in FIG. 2 is similar to that of FIG. 1 in that when tail lamp 18 is functioning properly, the electrical resistance of photocell 28 is sufficiently low to permit energization of relay coil 38. Should tail lamp 18 become defective, the resistance of photocell 28 increases so as to prevent adequate current flow through relay coil 38 to maintain contacts 40 open. Closure of contacts 40 illuminates lamp 42.

Figure 3:
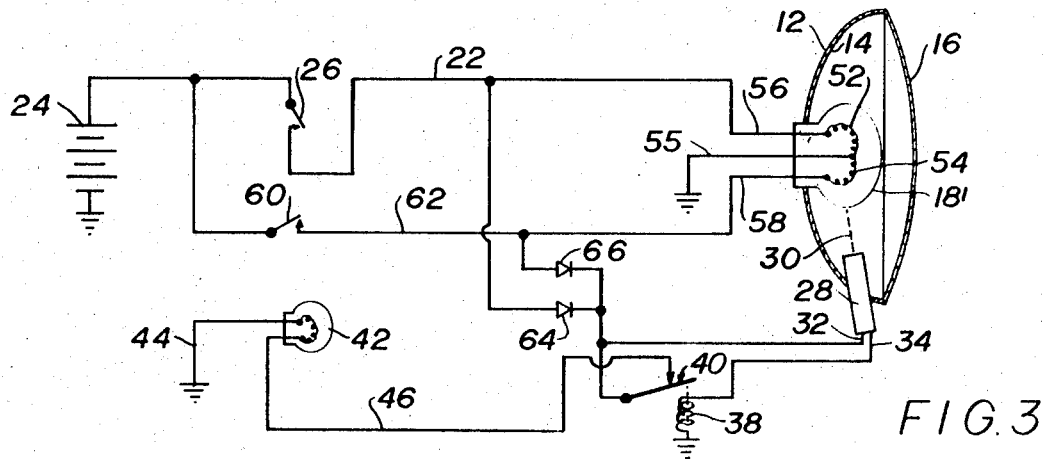
FIG. 3 is a schematic view of another modified form of my invention.

In FIG. 3 elements which are identical to corresponding elements of FIGS. 1 and 2 are designated by identical reference numerals. Mounted in housing 12 is a lamp 18' which has two separate filaments 52 and 54. The filaments have a common connection which is grounded at 55; filament 52 has an individual connection 56 and filament 54 has an individual connection 58. Such dual filament lamps are widely used and are arranged with one filament, for example filament 52, serving as a taillight and the other filament, for example filament 54, serving as a stoplight or brake light. Filament 52 is connected to battery 24 through dashboard-mounted light switch 26. Filament 54 is connected to battery 24 through a brake switch 60 and a conductor 62. Brake switch 60 is normally present in modern automobiles and has contacts that are closed each time the vehicle operator depresses the vehicle brake pedal. Output terminal 32 of photocell 28 is connected to conductor 22 through a diode 64 and is connected to conductor 62 through a diode 66. As can be seen in FIG. 3 diodes 64 and 66 are polarized so as to afford a low resistance path from battery 24 to input terminal 32 on the photocell and a high resistance path in the opposite direction. One side of relay contact 40 is also connected to the common connection between diodes 64 and 66.

The operation of the modification of the present invention shown in FIG. 3 can be appreciated by assuming that taillight switch 26 is closed by the vehicle operator. If filament 52 is operating properly, the electrical resistance of photocell 28 assumes a relatively low magnitude as a consequence of which the current flow through relay coil 38 is adequate to actuate the relay and open contacts 40. If filament 52 is defective, however, the electrical resistance of photocell 28 assumes a relatively high value, and inadequate current to operate relay coil 38 is supplied thereto from battery 24 through switch 26, conductor 22, diode 64 and the photocell. Relay coil 38 is deenergized so as to close contacts 40. In response to operation of relay coil 38, lamp 42 is thus illuminated so as to apprise the vehicle operator of a defective taillight. In order to test filament 54 of lamp 18, switch 26 is moved to the "open" or "off" position and the vehicle brake pedal is depressed so as to close switch 60. Satisfactory operation of filament 54 will illuminate photocell 28 so as to drive the photocell to the relatively low resistance condition, in which condition the magnitude of current flow through relay coil 38 will be adequate to operate the relay and open contacts 40. If, on the other hand, filament 54 is defective, photocell 28 assumes a relatively high resistance condition and the current supplied to relay coil 38 from battery 24 through switch 60, conductor 62, diode 64 and photocell 28 is inadequate to energize coil 38, such deenergization of relay 38 closes contact 40 and causes illumination of indicator lamp 42 as described previously. The presence of diodes 64 and 66 permits utilization of a single photocell 28 and a single relay 38 without introducing unwanted cross-connections between conductors 22 and 62.

Figure 4:
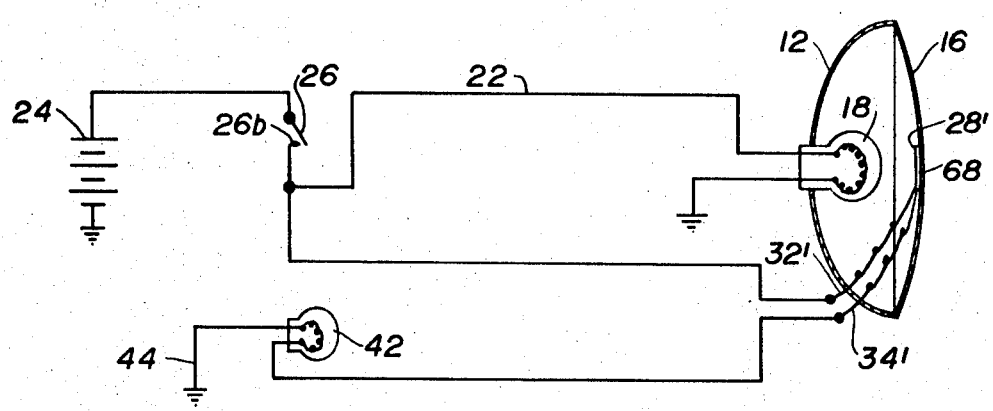
FIG. 4 is a schematic view of still another modified form of my invention.

The modification of my invention shown in FIG. 4 has certain elements substantially identical to the embodiments described above, and such elements are designated by identical reference numerals. In the embodiment of FIG. 4 a photocell 28' is adhesively mounted at 68 to the center of lens 16 and is oriented for light communication with lamp 18. Photocell 28' is preferably a substantially flat element having a diameter of approximately three-quarters inch; such photocell has been found satisfactory for the purpose herein contemplated without significantly affecting the light output of the taillight structure. The photocell has an output lead 32' connected to the filament of dashboard lamp 42. In one circuit designed according to FIG. 4, there is employed a photocell 28' having a relatively high resistance when dark and a relatively low resistance when illuminated, as a consequence of which dashboard lamp 42 is illuminated when taillamp 18 operates correctly. In such exemplary circuit, dashboard lamp 42 is extinguished when taillamp 18 malfunctions. As in the embodiment described above, the indicator circuit of FIG. 4 draws no current when switch 26 is in the off or opened position, since the indicating circuit, and specifically terminal 32' of the photocell, is connected only to contact 26b, which is connected to battery 24 only when switch 26 is closed.

In the foregoing description, battery 24 is shown with the negative terminal thereof grounded to the frame of the vehicle. Obviously, the system has equal application to positive ground vehicle power system. In the latter case the only significant difference is that the polarity of diodes 64 and 66 (FIG. 3) is reversed.

Thus, it will be seen that the present invention provides a taillight burn-out detecting system which is accurate, which can be expeditiously installed on existing vehicle lighting systems and which is capable of installation on existing systems without disturbing existing circuit connections. Moreover, the system of the invention avoids false indications by orientation of the photocell such that the photocell will not be excited by external sources of light energy.

Although several embodiments of the invention have been shown and described, it will be obvious that other adaptations and modifications can be made without departing from the true spirit and scope of the invention.

What is claimed is:

1. Apparatus for indicating the malfunction of a plurality of light emanating filaments that are carried on an automobile which includes a battery and a first mechanically operable switch for selectively connecting one lamp filament to the battery and a second mechanically operable switch for selectively connecting the other filament to said battery and which lamp filaments are mounted in the same light reflective housing having a transparent lens on one side thereof, said apparatus comprising: a photocell mounted interiorly of said housing in light communication with both said lamp filaments, said photocell having an electrical impedance proportional to the intensity of light energy impinging thereon; an indicator light mounted for viewing of the operator of the automobile; first and second electric circuit means mechanically independent of said switches and electrically in parallel with the filament circuits at one end and connected to an input of said indicator light at said other end for illuminating said indicator light; said first and second electric circuit means each including one-way current flow means to prevent cross connection between said first and second filaments through said first and second electric circuit means.

References Cited

UNITED STATES PATENTS

| | | |
|---|---|---|
| 1,107,438 | 8/1914 | Moskowitz. |
| 1,450,549 | 4/1923 | Howard. |
| 3,044,051 | 7/1962 | Block. |

DONALD J. YUSKO, Primary Examiner

H. S. COHEN, Assistant Examiner

U.S. Cl. X.R.

340—251, 228